United States Patent
Watanabe et al.

(10) Patent No.: US 10,683,908 B2
(45) Date of Patent: Jun. 16, 2020

(54) TORQUE CONVERTER

(71) Applicant: YUTAKA GIKEN CO., LTD., Hamamatsu-shi, Shizuoka (JP)

(72) Inventors: Kentaro Watanabe, Hamamatsu (JP); Ayako Shibazaki, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 115 days.

(21) Appl. No.: 16/090,950

(22) PCT Filed: Mar. 16, 2017

(86) PCT No.: PCT/JP2017/010597
§ 371 (c)(1),
(2) Date: Oct. 3, 2018

(87) PCT Pub. No.: WO2017/175557
PCT Pub. Date: Oct. 12, 2017

(65) Prior Publication Data
US 2019/0120322 A1    Apr. 25, 2019

(30) Foreign Application Priority Data

Apr. 8, 2016  (JP) .................................. 2016-077970

(51) Int. Cl.
*F16F 15/134*    (2006.01)
*F16H 45/02*    (2006.01)
(Continued)

(52) U.S. Cl.
CPC ............ *F16F 15/134* (2013.01); *F16F 15/30* (2013.01); *F16H 45/02* (2013.01);
(Continued)

(58) Field of Classification Search
CPC ............................................... F16H 2045/0263
See application file for complete search history.

(56) References Cited

U.S. PATENT DOCUMENTS 8,695,771 B2    4/2014    Matsuoka et al.
9,732,835 B2    8/2017    Kawahara et al.
(Continued)

FOREIGN PATENT DOCUMENTS

JP    2007-113659 A    5/2007
JP    2009-115112 A    5/2009
(Continued)

*Primary Examiner* — Mark A Manley
(74) *Attorney, Agent, or Firm* — Carrier Blackman & Associates, P.C.; Joseph P. Carrier; Fulchand P. Shende (57) ABSTRACT

A torque converter is provided in which abutment claw portions provided integrally with one of a pair of retaining plates of a dynamic damper mechanism are inserted into a cutout part, a spring retaining member fixed to a clutch piston having the cutout part, wherein the cutout part is formed so that an inner end of the cutout part along a radial direction of an output shaft is positioned further outside than an inside end of a damper spring in the radial direction, and the abutment claw portion is formed so that part of the abutment claw portion overlaps an inertia plate in a projection onto a plane passing through the abutment claw portion and an axis of the output shaft. Such arrangement shortens the axial distance between the clutch piston and the dynamic damper mechanism while maintaining function of the spring retaining member in retaining the damper spring.

4 Claims, 9 Drawing Sheets

(51) Int. Cl.
*F16F 15/30* (2006.01)
*F16F 15/123* (2006.01)

(52) U.S. Cl.
CPC ............... *F16F 2230/0005* (2013.01); *F16H 2045/0231* (2013.01); *F16H 2045/0263* (2013.01); *F16H 2045/0278* (2013.01)

(56) References Cited

U.S. PATENT DOCUMENTS

| | | | |
|---|---|---|---|
| 10,260,612 B2 * | 4/2019 | Kawahara | ............... F16H 45/02 |
| 2016/0169358 A1 * | 6/2016 | Kawahara | ........... F16F 15/1421 |
| | | | 192/3.28 |

FOREIGN PATENT DOCUMENTS

| | | |
|---|---|---|
| JP | 2009-293671 A | 12/2009 |
| WO | 2015/005379 A1 | 1/2015 |

* cited by examiner

TORQUE CONVERTER

TECHNICAL FIELD

The present invention relates to a torque converter that includes a dynamic damper mechanism provided in a torque transmission path via which, when a lockup clutch having a clutch piston is connected, torque is transmitted between the clutch piston and an output shaft, the clutch piston being capable of being frictionally connected to a transmission cover joined to a pump impeller, the dynamic damper mechanism including a pair of retaining plates arranged with a gap in an axial direction of the output shaft while rotating together with a rotation transmitting member forming part of the torque transmission path, an inertial rotating body having an inertia plate sandwiched between the retaining plates, and a dynamic damper spring provided between the retaining plate and the inertia plate, and a damper mechanism disposed in the torque transmission path, the damper mechanism being formed from a plurality of damper springs, a spring retaining member fixed to the clutch piston while having spring cover portions formed into an arc-shaped cross section so as to retain the damper springs between the spring cover portions and the clutch piston and a plurality of cutout parts disposed between the spring cover portions, and a plurality of abutment claw portions provided integrally with one of the pair of retaining plates so as to be inserted into the cutout part and sandwich the damper spring between the abutment claw portion and the spring retaining member.

BACKGROUND ART

Such a torque converter is known from Patent Document 1. In this arrangement, of a pair of retaining plates, an abutment claw part provided integrally with the retaining plate on a clutch piston side is inserted into a cutout part of a spring retaining member, and this abutment claw part is formed so as to be inclined outward along the radial direction of the clutch piston in going toward the clutch piston side.

RELATED ART DOCUMENTS

Patent Documents

Patent Document 1: Japanese Patent Application Laid-open No. 2009-293671

SUMMARY OF THE INVENTION

Problems to be Solved by the Invention

In order to make the clutch piston and the torque converter compact in the axial direction, it is desirable that the axial distance between the clutch piston and a dynamic damper mechanism is shortened, but in the arrangement disclosed by Patent Document 1 above, among the pair of retaining plates, since the abutment claw part is formed integrally with the retaining plate on the clutch piston side, and this abutment claw part is formed so as to be inclined and extend toward the clutch piston side, if the axial distance between the clutch piston and the dynamic damper mechanism is shortened, in order to avoid the abutment claw part interfering with a spring cover part for the spring retaining member, it is necessary to dispose the abutment claw part further inward in the radial direction of the output shaft. By so doing, it becomes necessary to dispose the inner end along the radial direction of the cutout part, which is formed in the spring retaining member so that the abutment claw part is inserted therethrough, further inward along the radial direction, and there is a possibility that the function of the spring retaining member in retaining a damper spring will be degraded.

The present invention has been accomplished in light of such circumstances, and it is an object thereof to provide a torque converter that enables the axial distance between a clutch piston and a dynamic damper mechanism to be shortened while maintaining the function of a spring retaining member in retaining a damper spring.

Means for Solving the Problems

In order to attain the above object, according to a first aspect of the present invention, there is provided a torque converter comprising a dynamic damper mechanism provided in a torque transmission path via which, when a lockup clutch having a clutch piston is connected, torque is transmitted between the clutch piston and an output shaft, the clutch piston being capable of being frictionally connected to a transmission cover joined to a pump impeller, the dynamic damper mechanism comprising a pair of retaining plates arranged with a gap in an axial direction of the output shaft while rotating together with a rotation transmitting member forming part of the torque transmission path, an inertial rotating body having an inertia plate sandwiched between the retaining plates, and a dynamic damper spring provided between the retaining plate and the inertia plate, and a damper mechanism disposed in the torque transmission path, the damper mechanism being formed from a plurality of damper springs, a spring retaining member fixed to the clutch piston while having a plurality of spring cover portions formed into an arc-shaped cross section so as to retain the damper springs between the spring cover portions and the clutch piston and a plurality of cutout parts disposed between the spring cover portions, and a plurality of abutment claw portions provided integrally with one of the pair of retaining plates so as to be inserted into the cutout part and sandwich the damper spring between the abutment claw portion and the spring retaining member, characterized in that the cutout part is formed so that an inner end of the cutout part along a radial direction of the output shaft is positioned further outside than an inside end of the damper spring in the radial direction, and the abutment claw portion is formed so that part of the abutment claw portion overlaps the inertia plate in a projection onto a plane passing through the abutment claw portion and an axis of the output shaft.

Further, according to a second aspect of the present invention, in addition to the first aspect, a rotation restricting hole housing part of the abutment claw portion and extending lengthwise in a peripheral direction is formed in the inertia plate so that abutment of the abutment claw portion against an end part in the peripheral direction of the rotation restricting hole restricts the relative rotational angle between the pair of retaining plates and the inertial rotating body.

According to a third aspect of the present invention, in addition to the second aspect, part of the other retaining plate of the pair of retaining plates is disposed within the rotation restricting hole and abuts against and is fixed by swaging to the abutment claw portion.

Moreover, according to a fourth aspect of the present invention, there is provided a torque converter comprising a dynamic damper mechanism provided in a torque transmission path via which, when a lockup clutch having a clutch piston is connected, torque is transmitted between the clutch piston and an output shaft, the clutch piston being capable of being frictionally connected to a transmission cover joined to a pump impeller, the dynamic damper mechanism comprising a pair of retaining plates arranged with a gap in an axial direction of the output shaft therebetween while rotating together with a rotation transmitting member forming part of the torque transmission path, an inertial rotating body having an inertia plate sandwiched between the retaining plates, and a dynamic damper spring provided between the retaining plate and the inertia plate, and a damper mechanism disposed in the torque transmission path, the damper mechanism being formed from a plurality of damper springs, a spring retaining member fixed to the clutch piston while having a plurality of spring cover portions formed into an arc-shaped cross section so as to retain the damper springs between the spring cover portions and the clutch piston, and a plurality of abutment claw portions provided integrally with one of the pair of retaining plates so as to sandwich the damper spring between the abutment claw portion and the spring retaining member, characterized in that the spring cover portion is formed so that at least part of the spring cover portion is positioned further outside in a radial direction than an inside end of the damper spring, and the abutment claw portion, which can abut against the damper spring outside, along the radial direction, the spring cover portion, is formed so that part of the abutment claw portion overlaps the inertia plate in a projection onto a plane passing through the abutment claw portion and an axis of the output shaft.

Effects of the Invention

In accordance with the first aspect of the present invention, since the inner end, along the radial direction of the output shaft, of the cutout part is present further outside than the inside end of the damper spring in the radial direction, and part of the abutment claw portion overlaps the inertia plate on a projection onto a plane passing through the abutment claw portion and the axis of the output shaft, it is possible to dispose the abutment claw portion further outside in the radial direction of the output shaft while avoiding any interference with the spring cover portion, and it is possible to shorten the axial distance between the clutch piston and the dynamic damper mechanism while maintaining the function of the spring retaining member in retaining the damper spring.

Furthermore, in accordance with the second aspect of the present invention, the relative rotational angle between the pair of retaining plates and the inertial rotating body is restricted with a simple arrangement in which part of the abutment claw part is housed in the rotation restricting hole formed in the inertia plate, thus preventing an excessive load from acting on the dynamic damper spring of the dynamic damper mechanism.

In accordance with the third aspect of the present invention, since of the pair of retaining plates, part of the retaining plate on the side where the abutment claw part is not provided is abutted against and fixed by swaging to the abutment claw part within the rotation restricting hole, it is unnecessary to use a spacer disposed so as to be present between the pair of retaining plates, thereby achieving a reduction in cost.

Furthermore, in accordance with the fourth aspect of the present invention, since at least part of the spring cover part is present further outside, in the radial direction of the output shaft, than the inside end of the damper spring, and part of the abutment claw part, which can abut against the damper spring outside the spring cover part along the radial direction, overlaps the inertia plate in a projection onto a plane passing through the abutment claw part and the axis of the output shaft, it is possible to maintain the function of the spring retaining member in retaining the damper spring while avoiding any interference between the abutment claw part and the spring cover portion, and shorten the axial distance between the clutch piston and the dynamic damper mechanism.

EXPLANATION OF REFERENCE NUMERALS AND SYMBOLS

11 Pump impeller
20 Transmission cover
27 Output shaft
29 Output hub, which is a rotation transmitting member
40 Lockup clutch
43 Clutch piston
46A, 46B, 46C Torque transmission path
47A, 47B, 47C, 47D Damper mechanism
48A, 48B, 48C Dynamic damper mechanism
49 Damper spring
49a Inside end of damper spring
51, 91 Spring retaining member
51b, 91b Spring cover portion
54, 55, 74, 75, 84, 85 Retaining plate
54b, 74b, 85b Abutment claw portion
56 Inertial rotating body
57 Dynamic damper spring
58 Inertia plate
70 Cutout part
70a Inner end of cutout part
72, 76, 86 Rotation restricting hole

MODES FOR CARRYING OUT THE INVENTION

Embodiments of the present invention are explained below by reference to the attached drawings.

First Embodiment

A first embodiment of the present invention is explained by reference to FIG. 1 to FIG. 5; first, in FIG. 1, this torque converter includes a pump impeller 11, a turbine runner 12 disposed so as to oppose the pump impeller 11, and a stator 13 disposed between inner peripheral parts of the pump impeller 11 and the turbine runner 12, a circulation circuit 15 through which hydraulic oil circulates being formed as shown by an arrow 14 between the pump impeller 11, the turbine runner 12, and the stator 13.

The pump impeller 11 has a bowl-shaped pump shell 16, a plurality of pump blades 17 provided on an inner face of the pump shell 16, a pump core ring 18 linking the pump blades 17, and a pump hub 19 fixed to an inner peripheral part of the pump shell 16 by for example welding, an oil pump (not illustrated) supplying hydraulic oil to the torque converter being operatively linked to the pump hub 19.

Furthermore, a bowl-shaped transmission cover 20 covering the turbine runner 12 from the outside is joined by welding to an outer peripheral part of the pump shell 16, a ring gear 21 is fixed by welding to an outer peripheral part of the transmission cover 20, and a drive plate 22 is fastened to the ring gear 21. Moreover, a crankshaft 23 of a vehicle engine E is coaxially fastened to the drive plate 22, and rotational power is inputted from the vehicle engine E into the pump impeller 11.

The turbine runner 12 has a bowl-shaped turbine shell 24, a plurality of turbine blades 25 provided on an inner face of the turbine shell 24, and a turbine core ring 26 linked to the turbine blades 25.

An end part of an output shaft 27 transmitting rotational power from the vehicle engine E to a transmission, which is not illustrated, is supported, via a bearing bush 28, on a bottomed cylindrical support tube portion 20a integrally provided on a center part of the transmission cover 20. The output shaft 27 is spline joined to an output hub 29 disposed at a position spaced in the axial direction from the pump hub 19, and a needle thrust bearing 30 is disposed between the output hub 29 and the transmission cover 20.

The stator 13 has a stator hub 31 disposed between the pump hub 19 and the output hub 29, a plurality of stator blades 32 provided on the outer periphery of the stator hub 31, and a stator core ring 33 linking the outer periphery of the stator blades 32, a thrust bearing 34 is disposed between the pump hub 19 and the stator hub 31, and a thrust bearing 35 is disposed between the output hub 29 and the stator hub 31.

A one-way clutch 37 is disposed between the stator hub 31 and a stator shaft 36 relatively rotatably surrounding the output shaft 27 rotating together with the output hub 29, and the stator shaft 36 is non-rotatably supported on a transmission case (not illustrated).

A clutch chamber 38 communicating with the circulation circuit 15 is formed between the transmission cover 20 and the turbine shell 24. Housed within the clutch chamber 38 are a lockup clutch 40, an inertial rotating body 56 rotatably supported on the outer periphery of the output hub 29, and a spring holder 42A sandwiching part of the inertial rotating body 56 from opposite sides while enabling relative rotation with respect to the inertial rotating body 56 in a restricted range.

The lockup clutch 40 has a clutch piston 43 that can be frictionally connected to the transmission cover 20 and can switch between a connected state in which the clutch piston 43 is frictionally connected to the transmission cover 20 and a non-connected state in which the frictional connection is released, and an inner peripheral part of the clutch piston 43 formed into a disk shape is slidably supported on the output hub 29 so that it can move in the axial direction.

The interior of the clutch chamber 38 is divided by the clutch piston 43 into an inside chamber 38a on the turbine runner 12 side and an outside chamber 38b on the transmission cover 20 side, an oil groove 44 formed in the output hub 29 so as to be adjacent to the needle thrust bearing 30 communicates with the outside chamber 38b, and the oil groove 44 communicates with the interior of the cylindrical output shaft 27. Furthermore, an oil passage 45 communicating with an inner peripheral part of the circulation circuit 15 is formed between the pump hub 19 and the stator shaft 36. The oil pump and an oil reservoir (not illustrated) are alternately connected to the oil groove 44 and the oil passage 45.

When the vehicle engine E is idling or in a very low speed operating range, hydraulic oil is supplied from the oil groove 44 to the outside chamber 38b, and hydraulic oil is guided out from the oil passage 45; in this state the outside chamber 38b has a higher pressure than that of the inside chamber 38a, the clutch piston 43 is pushed toward the side on which it moves away from an inner face of the transmission cover 20, and the lockup clutch 40 attains a non-connected state. In this state, relative rotation between the pump impeller 11 and the turbine runner 12 is allowed, the pump impeller 11 is rotated by the vehicle engine E, hydraulic oil within the circulation circuit 15 thereby circulates within the circulation circuit 15 as shown by the arrow 14 in sequence from the pump impeller 11 to the turbine runner 12 and then to the stator 13, and rotational torque of the pump impeller 11 is transmitted to the output shaft 27 via the turbine runner 12, the spring holder 42A, and the output hub 29.

In a state in which there is amplification of torque between the pump impeller 11 and the turbine runner 12 the accompanying reaction force is borne by the stator 13, and the stator 13 is fixed by the locking function of the one-way clutch 37. Furthermore, when the amplification of torque is finished, the stator 13 rotates together with the pump impeller 11 and the turbine runner 12 in the same direction while making the one-way clutch 37 idle by reversing the direction of the torque that the stator 13 receives.

When such a torque converter attains a coupled state or a nearly coupled state, the connected states between the oil groove 44 and oil passage 45 and the oil pump and oil reservoir are switched over so that hydraulic oil is supplied from the oil passage 45 to the inside chamber 38a and hydraulic oil is guided out from the oil groove 44. As a result, the inside chamber 38a of the clutch chamber 38 has a higher pressure than that of the outside chamber 38b, the difference in pressure pushes the clutch piston 43 toward the transmission cover 20 side, an outer peripheral part of the clutch piston 43 is pressed against the inner face of the transmission cover 20 and is frictionally connected to the transmission cover 20, and the lockup clutch 40 attains a connected state.

When the lockup clutch 40 has attained the connected state, the torque transmitted from the vehicle engine E to the transmission cover 20 is mechanically transmitted to the output shaft 27 via a torque transmission path 46A, which includes the clutch piston 43, the spring holder 42A, and the output hub 29; at least one (one in this embodiment) damper mechanism 47A is disposed in the torque transmission path 46A, and a dynamic damper mechanism 48A is attached thereto.

Figure 2:
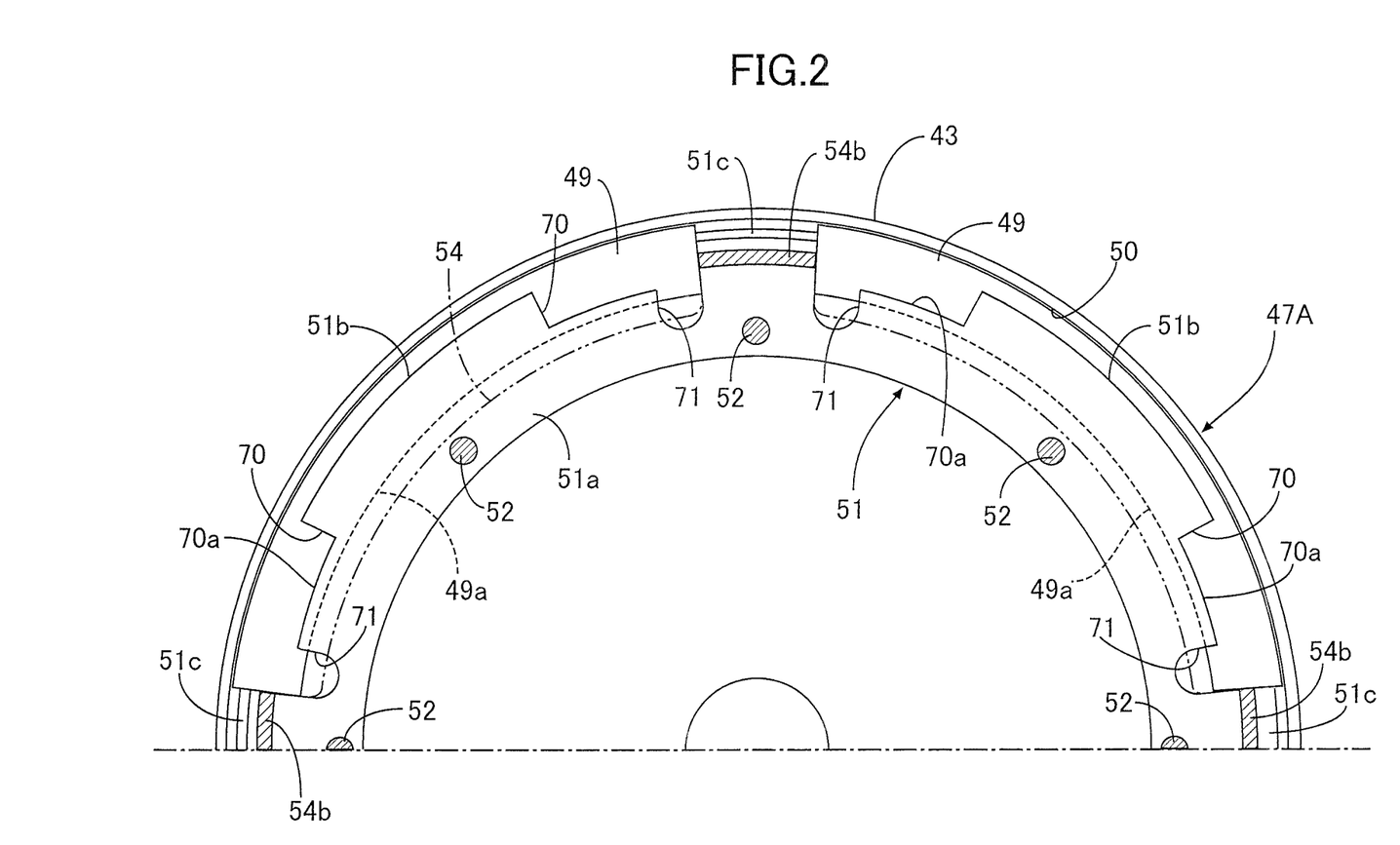
FIG. 2 is a diagram showing a damper mechanism from the direction of arrowed line 2-2 in FIG. 1. (first embodiment)

Referring in addition to FIG. 2, the damper mechanism 47A is formed by disposing a plurality of, for example four, coil-shaped damper springs 49 at equal intervals in the peripheral direction between the spring holder 42A and a spring retaining member 51 fixed to the clutch piston 43.

An annular housing recess part 50 is formed in a face, on the side opposite to the transmission cover 20, of an outer peripheral part of the clutch piston 43, and the spring retaining member 51 retaining the damper springs 49, which are housed within the housing recess part 50 at equal intervals in the peripheral direction, between itself and the clutch piston 43 is fixed to the clutch piston 43.

The spring retaining member 51 is formed so as to integrally have a ring plate portion 51a disposed coaxially with the clutch piston 43 while having an outer periphery substantially corresponding to the inner periphery of the housing recess part 50, a spring cover portion 51b formed into an arc-shaped cross section covering the inside of the damper spring 49 along the radial direction of the clutch piston 43, connected to four positions, equally spaced in the peripheral direction, of the outer periphery of the ring plate portion 51a, and formed lengthwise along the peripheral direction of the clutch piston 43, and a spring abutment portion 51c disposed between the spring cover portions 51b and connected to the outer periphery of the ring plate portion 51a so as to project further outward in the radial direction than the spring cover portion 51b, the ring plate portion 51a being fixed to the clutch piston 43 by means of a plurality of rivets 52.

The spring abutment portions 51c are disposed between the four damper springs 49, and when the lockup clutch 40 is in a non-connected state, the spring abutment portions 51c abut against opposite end parts of the damper spring 49.

Figure 3:
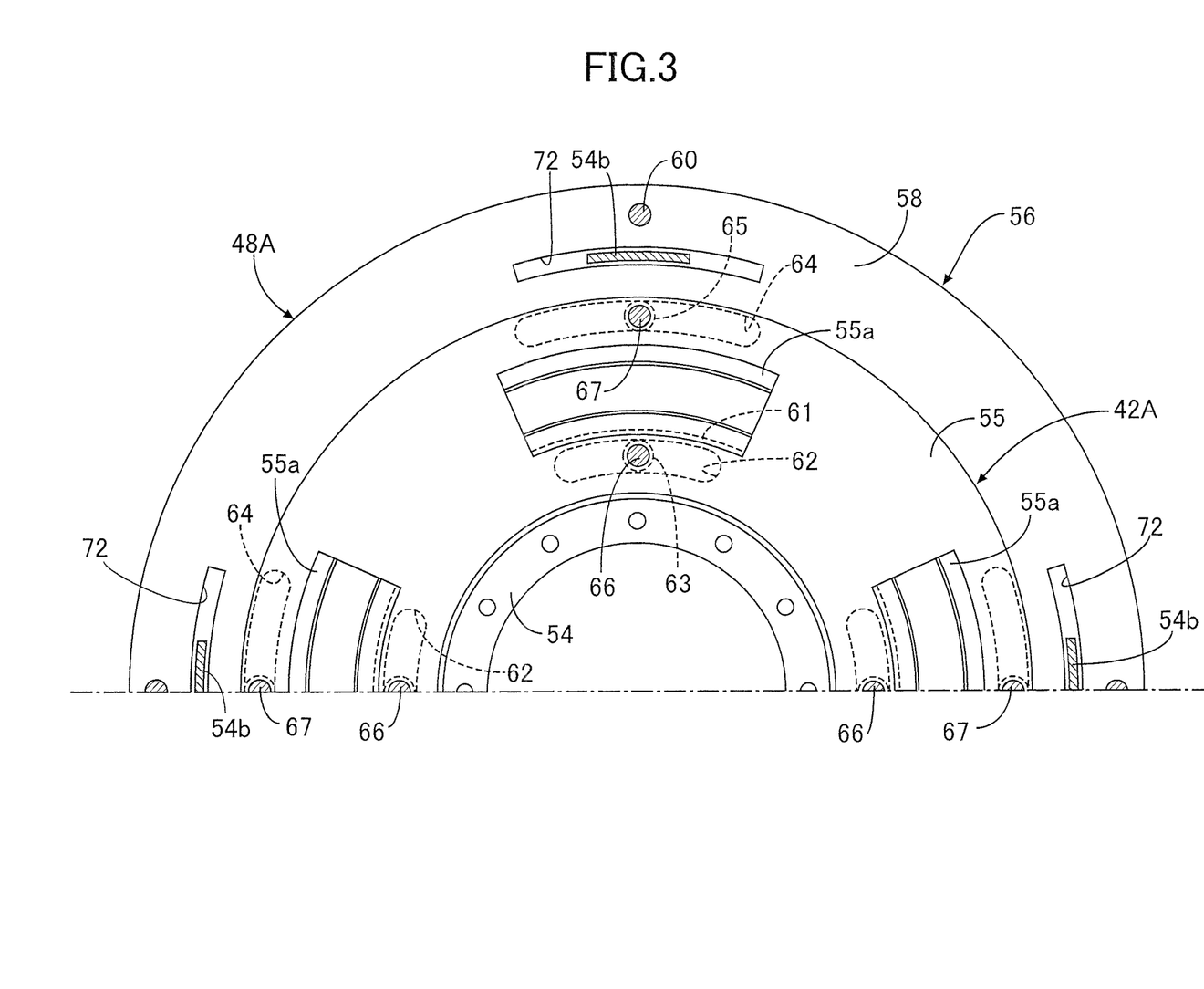
FIG. 3 is a diagram showing a dynamic damper mechanism from the direction of arrowed line 3-3 in FIG. 1. (first embodiment)

Referring in addition to FIG. 3, the dynamic damper mechanism 48A is formed by disposing a plurality of, for example six, coil-shaped dynamic damper springs 57 between the inertial rotating body 56 and the spring holder 42A rotating together with the output hub 29, which is a rotation transmitting member forming part of the torque transmission path 46A.

The spring holder 42A is formed from a pair of retaining plates 54 and 55 relatively non-rotatably linked to each other. The retaining plates 54 and 55 are disposed with a gap therebetween in the axial direction of the output shaft 27 while rotating together with the output hub 29, which is a rotation transmitting member forming part of the torque transmission path 46A, and of the pair of retaining plates 54 and 55 the retaining plate 54 on the turbine runner 12 side is fixed, by means of a plurality of rivets 53, to the output hub 29 together with the inner peripheral part of the turbine shell 24 of the turbine runner 12.

The inertial rotating body 56 is formed from a disk-shaped inertia plate 58 and a weight-adding member 59, the disk-shaped inertia plate 58 being sandwiched between the pair of retaining plates 54 and 55 forming the spring holder 42A and having its inner peripheral part rotatably supported on the output hub 29, and the weight-adding member 59 being fixed to the outer periphery of the inertia plate 58 by means of a rivet 60.

Spring-retaining portions 54a and 55a for retaining the dynamic damper spring 57 are formed at a plurality of, for example four, locations equally spaced in the peripheral direction of the retaining plates 54 and 55, part of the dynamic damper spring 57 facing the exterior. A spring housing hole 61 housing part of the dynamic damper spring 57 is formed in a portion, corresponding to the spring-retaining portions 54a and 55a, of the inertia plate 58 so that opposite end parts, along the peripheral direction of the inertia plate 58, of the spring housing hole 61 abut against opposite end parts of the dynamic damper spring 57 when the lockup clutch 40 is in a non-connected state.

The inertia plate 58 is formed so that its outer peripheral part projects further outward in the radial direction than the retaining plates 54 and 55, and the weight-adding member 59 is fixed to the outer peripheral part of the inertia plate 58.

Cylindrical spacers 63 each inserted into elongated holes 62 provided at a plurality of, for example four, locations equally spaced in the peripheral direction of the inertia plate 58 are disposed between the pair of retaining plates 54 and 55 on the inside, along the radial direction of the inertial rotating body 56, of the spring housing hole 61, and cylindrical spacers 65 each inserted into elongated holes 64 provided at a plurality of, for example four, locations equally spaced in the peripheral direction of the inertia plate 58 are disposed between the pair of retaining plates 54 and 55 on the outside, along the radial direction of the inertial rotating body 56, of the spring housing hole 61. The retaining plates 54 and 55 are linked by means of rivets 66 and 67 extending through the spacers 63 and 65 respectively. That is, the inertia plate 58 can rotate relative to the spring holder 42A in a restricted range via which the spacers 63 and 64 move within the elongated holes 62 and 64.

Provided integrally with one of the pair of retaining plates 54 and 55 forming the spring holder 42A, in this embodiment, of the retaining plates 54 and 55, the retaining plate 54 on the side opposite to the clutch piston 43 of the lockup clutch 40, are a plurality of abutment claw portions 54b sandwiching the damper spring 49 between themselves and the spring abutment portion 51c of the spring retaining member 51. The damper mechanism 47A is formed by disposing the damper spring 49 between the spring abutment portion 51c of the spring retaining member 51 fixed to the clutch piston 43 and the abutment claw portion 54b of the retaining plate 54 of the spring holder 42A.

In this embodiment, the abutment claw portions 54b, of which there are the same number as for the four damper springs 49, are bent so as to protrude toward the side opposite to the damper spring 49 from the outer periphery of the retaining plate 54, and are provided integrally with the retaining plate 54 so as to extend from the bent part in a direction along the axis of the output shaft 27. Moreover, it is desirable that the extremity of the abutment claw portion 54b passes through a cross section center C of the damper spring 49 or is disposed further outward than the cross section center C in the radial direction of the output shaft 27. Furthermore, of the pair of retaining plates 54 and 55, the plate thickness of the retaining plate 54 on the side on which the abutment claw portion 54b is provided is set larger than the plate thickness of the other retaining plate 55.

Referring to FIG. 2, a plurality of cutout parts 70 disposed between the plurality of spring cover portions 51b are formed in the spring retaining member 51 fixed to the clutch piston 43, the abutment claw portion 54b being inserted through the cutout part 70.

The cutout parts 70 are formed at a plurality of, for example four, locations equally spaced in the peripheral direction of the spring retaining member 51 so as to be long in the peripheral direction and open toward the extremity side of the spring cover portion 51b. Moreover, the cutout part 70 is formed in the spring retaining member 51 so that an inner end 70a of the cutout part 70 along the radial direction of the output shaft 27 is positioned further outside than an inside end 49a of the damper spring 49 in the radial direction. That is, as shown in FIG. 1, the inner end 70a of the cutout part 70 is disposed at a position further outside along the radial direction than a virtual straight line L passing through the inside end 49a of the damper spring 49 and extending in parallel with the axis of the output shaft 27 on a projection onto a plane passing through the abutment claw portion 54b and the axis of the output shaft 27.

On the other hand, the spring abutment portion 51c is disposed so as to be positioned in a middle part in the peripheral direction of the cutout part 70 when viewed from the spring holder 42A side, and a recess part 71 for forming the spring cover portion 51b into an arc-shaped cross section so as to cover the damper spring 49 is formed in opposite sides of a base part of the spring abutment portion 51c so as to communicate with the cutout part 70.

Figure 1:
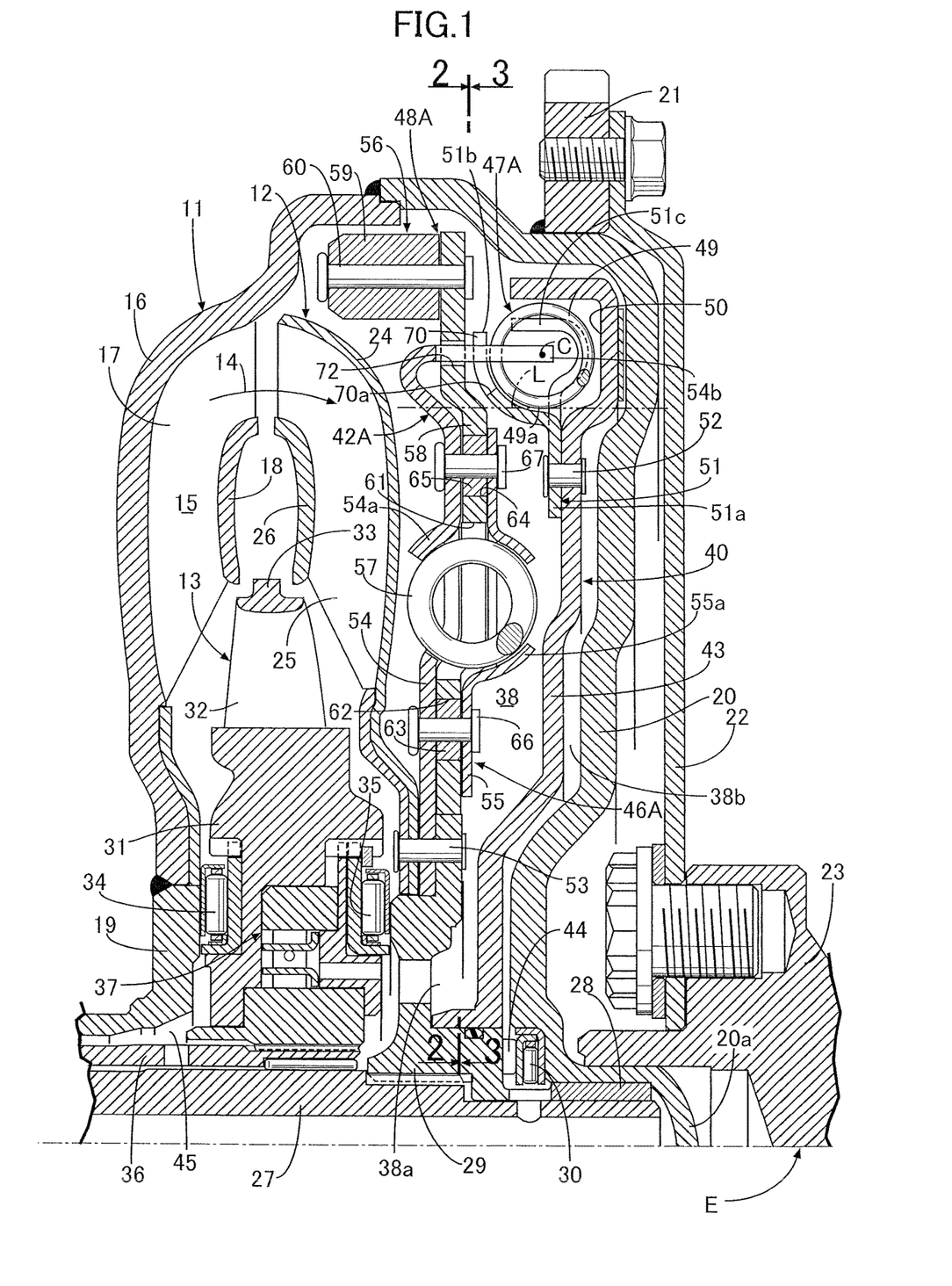
FIG. 1 is a vertical sectional view of a torque converter of a first embodiment. (first embodiment)
Figure 4:
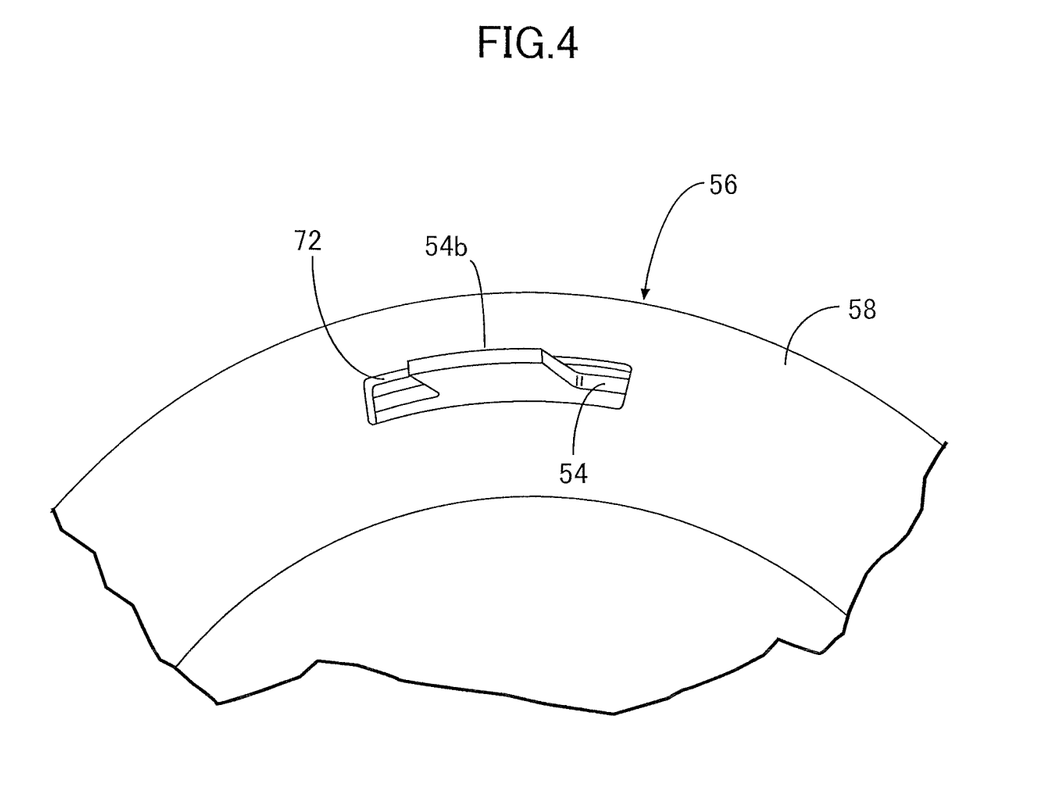
FIG. 4 is a perspective view, from a lockup clutch side, of a state in which an abutment claw part is inserted into a rotation restricting hole of an inertia plate. (first embodiment)

The abutment claw portion 54b is, as clearly shown in FIG. 1, bendingly formed so that part of the abutment claw portion 54b overlaps the inertia plate 58 on a projection onto a plane passing through the abutment claw portion 54b and the axis of the output shaft 27, and in this embodiment as shown in FIG. 1 and FIG. 4 a rotation restricting hole 72 extending lengthwise in the peripheral direction is formed in the inertia plate 58, the abutment claw portion 54b being inserted through the rotation restricting hole 72 so that part thereof is housed in the rotation restricting hole 72.

Figure 5:
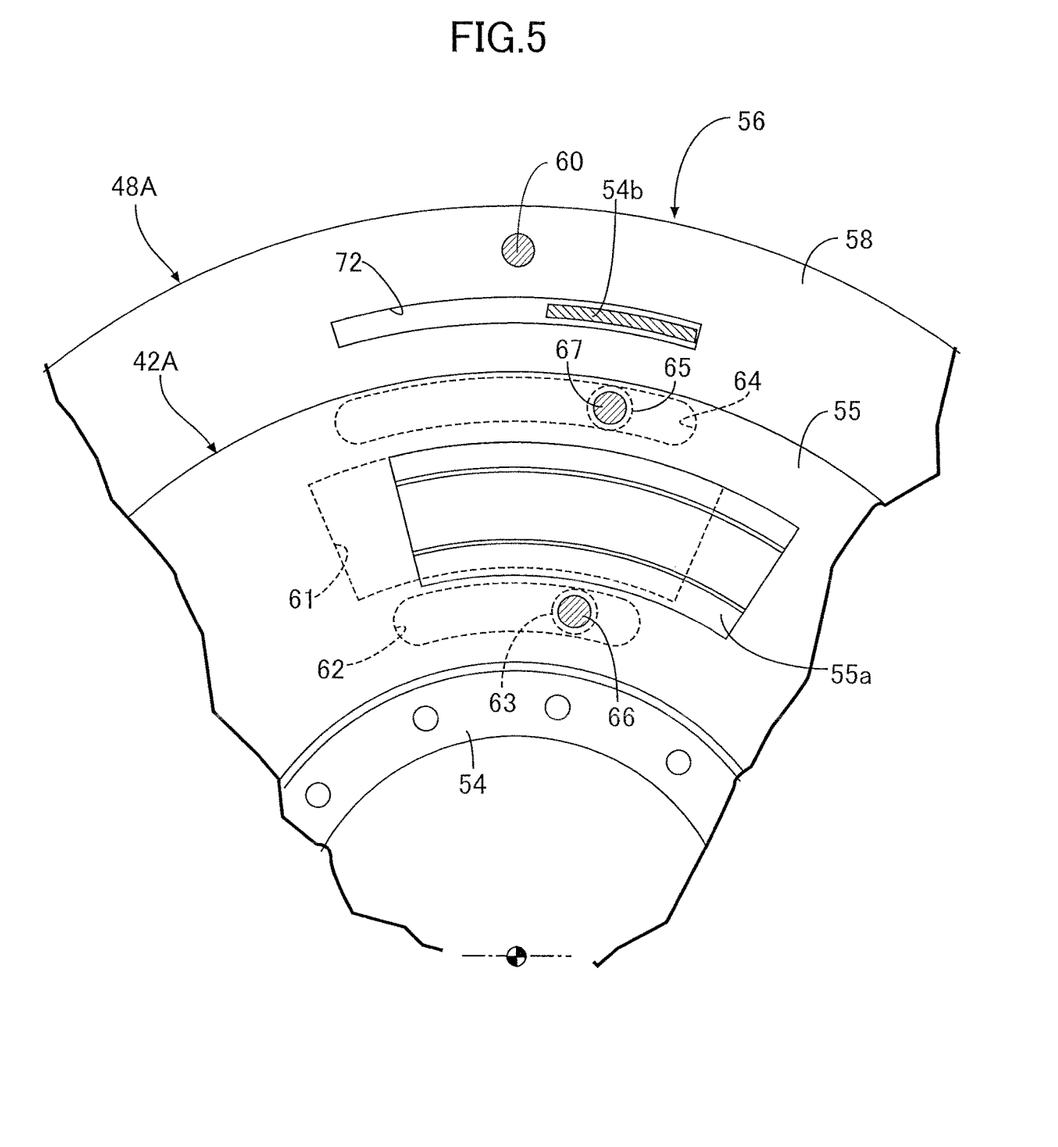
FIG. 5 is a diagram showing an essential part of FIG. 3 in a state in which the relative rotational angle between a retaining plate and an inertial rotating body is restricted. (first embodiment)

Moreover, as shown in FIG. 5 the rotation restricting hole 72 is formed so as to restrict the relative rotational angle between the pair of retaining plates 54 and 55 and the inertial rotating body 56 by the abutment claw portion 54b abutting against an end part, in the peripheral direction, of the rotation restricting hole 72.

When the lockup clutch 40 attains a connected state and the clutch piston 43 and the spring retaining member 51 rotate, the spring abutment portion 51c compresses the damper spring 49 between itself and the abutment claw portion 54b, and power is transmitted from the damper spring 49 to the output shaft 27 via the spring holder 42A connected to the abutment claw portion 54b and the output hub 29. That is, torque is mechanically transmitted between the clutch piston 43 and the output shaft 27 via the torque transmission path 46A.

The operation of the first embodiment is now explained. The damper mechanism 47A is formed from the plurality of damper springs 49, the spring retaining member 51, and the plurality of abutment claw portions 54b. The spring retaining member 51 is fixed to the clutch piston 43 while having the plurality of spring cover portions 51b formed into an arc-shaped cross section so as to retain the damper springs 49 between itself and the clutch piston 43. The plurality of abutment claw portions 54b are provided integrally with one retaining plate 54 of the pair of retaining plates 54 and 55 forming part of the dynamic damper mechanism 48A and sandwiching the inertia plate 58 of the inertial rotating body 56, and sandwich the damper spring 49 between themselves and the spring retaining member 51. The inner end 70a, along the radial direction of the output shaft 27, of the cutout part 70 formed in the spring retaining member 51 so that the abutment claw portion 54b is inserted through the cutout part 70 is disposed further outside than the inside end 49a of the damper spring 49 in the radial direction, and the abutment claw portion 54b is formed so that part of the abutment claw portion 54b overlaps the inertia plate 58 on a projection onto a plane passing through the abutment claw portion 54b and the axis of the output shaft 27. It is therefore possible to dispose the abutment claw portion 54b further outside in the radial direction of the output shaft 27 while avoiding any interference with the spring cover portion 51b, and it is possible to shorten the axial distance between the clutch piston 43 and the dynamic damper mechanism 48A while maintaining the function of the spring retaining member 51 in retaining the damper spring 49.

Moreover, the abutment claw portion 54b is provided integrally with the retaining plate 54 of the pair of retaining plates 54 and 55, which is on the side opposite to the clutch piston 43 of the lockup clutch 40, and it is possible to further shorten the axial distance between the clutch piston 43 and the dynamic damper mechanism 48A.

Furthermore, since the extremity of the abutment claw portion 54b is disposed at a position either passing through the cross section center C of the damper spring 49 or further outside than the cross section center C in the radial direction of the output shaft 27, curvature of the damper spring 49 that makes it protrude toward the radially outward direction of the output shaft 27 is suppressed when the damper spring 49 is compressed, and it is possible to suppress the occurrence of a frictional force due to the damper spring 49 making frictional contact with the clutch piston 43.

Moreover, since the rotation restricting hole 72 housing part of the abutment claw portion 54b and extending lengthwise in the peripheral direction is formed in the inertia plate 58 so that the relative rotational angle between the pair of retaining plates 54 and 55 and the inertial rotating body 56 is restricted by the abutment claw portion 54b abutting against an end part in the peripheral direction of the rotation restricting hole 72, it is possible to restrict the relative rotational angle between the pair of retaining plates 54 and 55 and the inertial rotating body 56 with a simple arrangement, and it is possible to prevent an excessive load from acting on the dynamic damper spring 57 of the dynamic damper mechanism 48A.

Second Embodiment

Figure 6:
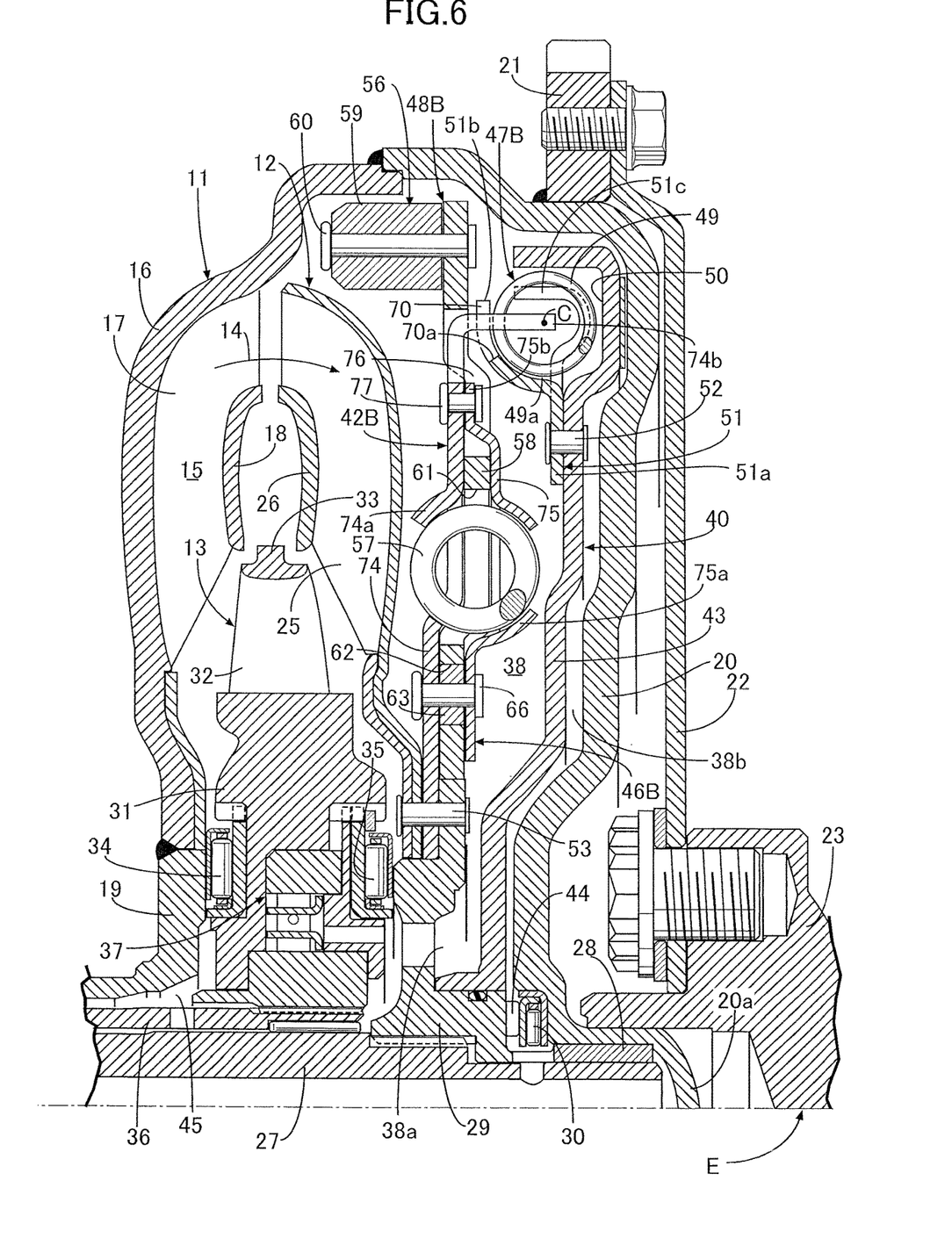
FIG. 6 is a vertical sectional view of a torque converter of a second embodiment. (second embodiment)

A second embodiment of the present invention is explained by reference to FIG. 6; parts corresponding to those of the first embodiment above are denoted by the same reference numerals and symbols and only illustrated, detailed explanation thereof being omitted.

When the lockup clutch 40 attains a connected state, torque transmitted from the vehicle engine E to the transmission cover 20 is mechanically transmitted to the output shaft 27 via a torque transmission path 46B that includes the clutch piston 43, a spring holder 42B, and the output hub 29. At least one (one in this embodiment) damper mechanism 47B is disposed in the torque transmission path 46B, and a dynamic damper mechanism 48B is attached thereto.

The damper mechanism 47B is formed by disposing a plurality of, for example four, coil-shaped damper springs 49 between the spring holder 42B and the spring retaining member 51 fixed to the clutch piston 43 so as to be equally spaced in the peripheral direction.

The dynamic damper mechanism 48B is formed by disposing a plurality of, for example six, coil-shaped dynamic damper springs 57 between the inertial rotating body 56 and the spring holder 42B rotating together with the output hub 29, which is a rotation transmitting member forming part of the torque transmission path 46B.

The spring holder 42B is formed from a pair of retaining plates 74 and 75 relatively non-rotatably linked to each other, the retaining plates 74 and 75 being disposed with a gap therebetween in the axial direction of the output shaft 27 while rotating together with the output hub 29, which is a rotation transmitting member forming part of the torque transmission path 46B. Moreover, of the pair of retaining plates 74 and 75, the retaining plate 74 on the turbine runner 12 side is fixed to the output hub 29 together with the inner peripheral part of the turbine shell 24 of the turbine runner 12 by means of a plurality of rivets 53.

The inertial rotating body 56 is formed from the disk-shaped inertia plate 58 sandwiched between the pair of retaining plates 74 and 75 forming the spring holder 42B and having its inner peripheral part rotatably supported on the output hub 29, and the weight-adding member 59 fixed to the outer periphery of the inertia plate 58.

Spring-retaining portions 74a and 75a for retaining the dynamic damper spring 57 are formed on a plurality of, for example four, locations, equally spaced in the peripheral direction, of the retaining plates 74 and 75 so that part of the dynamic damper spring 57 faces the exterior. The spring housing hole 61 housing part of the dynamic damper spring 57 is formed in a portion, corresponding to the spring-retaining portions 74a and 75a, of the inertia plate 58 so that when the lockup clutch 40 is in a non-connected state opposite end parts, along the peripheral direction of the inertia plate 58, of the spring housing hole 61 abut against opposite end parts of the dynamic damper spring 57.

The cylindrical spacers 63 inserted through the elongated holes 62 provided at a plurality of, for example four, locations, equally spaced in the peripheral direction, of the inertia plate 58 are disposed between the pair of retaining plates 74 and 75 on the inside of the spring housing hole 61 along the radial direction of the inertial rotating body 56, and the retaining plates 74 and 75 are linked by the rivet 66 extending through the spacer 63.

A plurality of abutment claw portions 74b are provided integrally with one of the pair of retaining plates 74 and 75 forming the spring holder 42B, in this embodiment the retaining plate 74 on the side opposite the clutch piston 43 of the lockup clutch 40 among the retaining plates 74 and 75, the abutment claw portions 74b being inserted through the cutout part 70 formed in the spring retaining member 51 fixed to the clutch piston 43 and sandwiching the damper spring 49 between themselves and the spring abutment portion 51c of the spring retaining member 51. The damper mechanism 47B is formed by disposing the damper spring 49 between the spring abutment portion 51c of the spring retaining member 51 fixed to the clutch piston 43 and the abutment claw portion 74b of the retaining plate 74 of the spring holder 42B.

Of the pair of retaining plates 74 and 75, the retaining plate 74 on the side on which the abutment claw portion 74b is provided has a plate thickness that is set larger than the plate thickness of the other retaining plate 75.

The abutment claw portion 74b is bent so that part of the abutment claw portion 74b overlaps the inertia plate 58 on a projection onto a plane passing through the abutment claw portion 74b and the axis of the output shaft 27, and in this second embodiment a rotation restricting hole 76 extending lengthwise in the peripheral direction is formed in the inertia plate 58, the abutment claw portion 74b being inserted through the rotation restricting hole 76 so that part thereof is housed in the rotation restricting hole 76.

Moreover, part of the other of the pair of retaining plates 74 and 75, that is, the retaining plate 75, is disposed within the rotation restricting hole 76 and abuts against and is fixed by swaging to the abutment claw portion 74b; in this second embodiment a mounting plate portion 75b connectedly provided integrally with the outer periphery of the retaining plate 75 and disposed within the rotation restricting hole 76 is disposed within the rotation restricting hole 76, abutted against the abutment claw portion 74b, and fixed by swaging to the abutment claw portion 74b using a rivet 77.

In accordance with the second embodiment, in addition to the same effects as those of the first embodiment above being exhibited, since the pair of retaining plates 74 and 75 are fixed further outside than the dynamic damper spring 57 in the radial direction of the output shaft 27, it is unnecessary to use a spacer disposed so as to be present between the two retaining plates 74 and 75, thereby achieving a reduction in cost.

Third Embodiment

Figure 7:
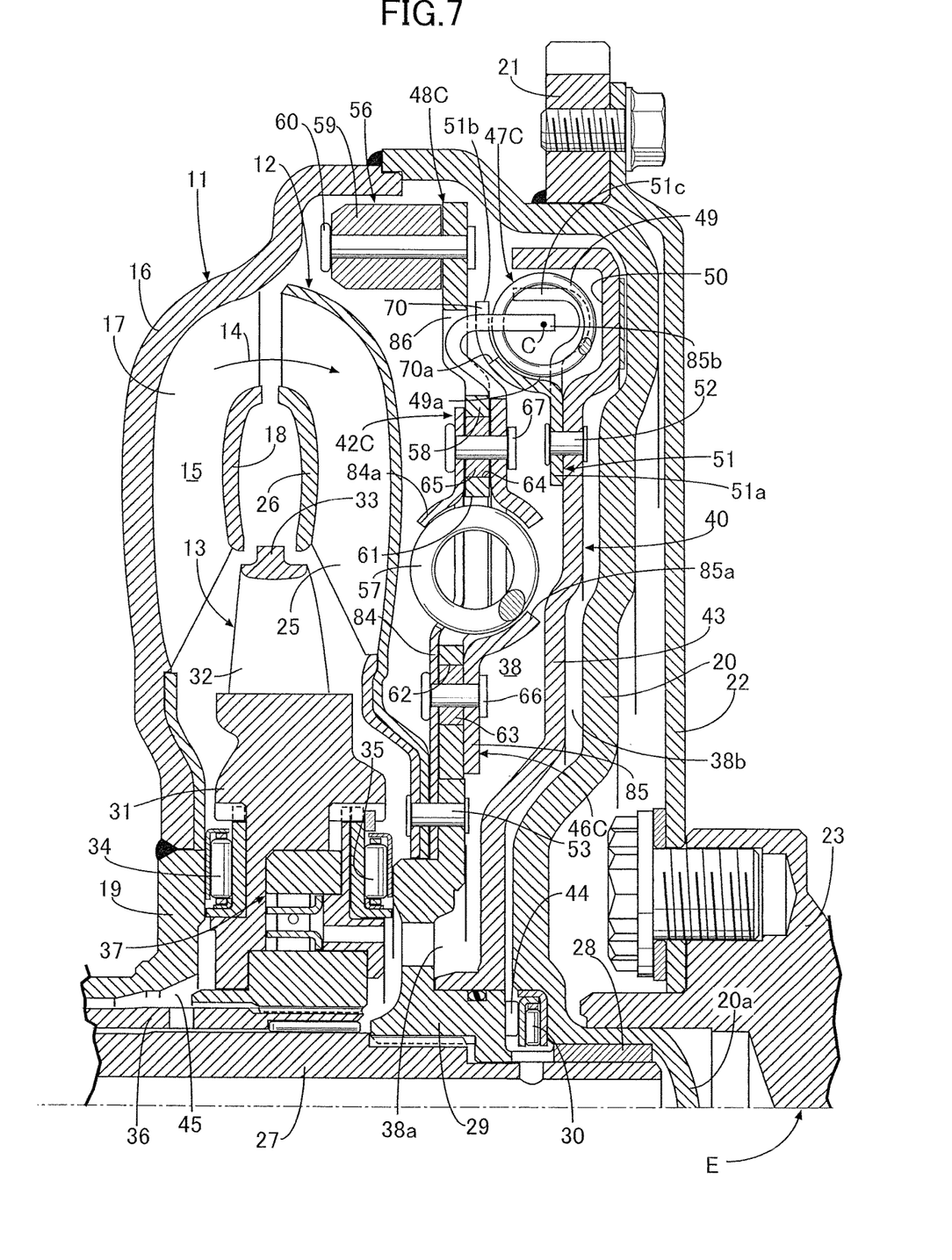
FIG. 7 is a vertical sectional view of a torque converter of a third embodiment. (third embodiment)

A third embodiment of the present invention is explained below by reference to FIG. 7; parts corresponding to those of the first embodiment above are denoted by the same reference numerals and symbols and only illustrated, detailed explanation thereof being omitted.

When the lockup clutch 40 has attained a connected state, the torque transmitted from the vehicle engine E to the transmission cover 20 is mechanically transmitted to the output shaft 27 via a torque transmission path 46C, which includes the clutch piston 43, a spring holder 42C, and the output hub 29, at least one (one in this embodiment) damper mechanism 47C is disposed in the torque transmission path 46C, and a dynamic damper mechanism 48C is attached thereto.

The damper mechanism 47C is formed by disposing a plurality of, for example four, coil-shaped damper springs 49 at equal intervals in the peripheral direction between the spring holder 42C and a spring retaining member 51 fixed to the clutch piston 43.

The dynamic damper mechanism 48C is formed by disposing a plurality of, for example six, coil-shaped dynamic damper springs 57 between the inertial rotating body 56 and the spring holder 42C rotating together with the output hub 29, which is a rotation transmitting member forming part of the torque transmission path 46C.

The spring holder 42C is formed from a pair of retaining plates 84 and 85 forming part of the torque transmission path 46C, the retaining plates 84 and 85 being disposed with a gap therebetween in the axial direction of the output shaft 27 while rotating together with the output hub 29, which is a rotation transmitting member forming part of the torque transmission path 46C. Moreover, of the pair of retaining plates 84 and 85, the retaining plate 84 on the turbine runner 12 side is fixed to the output hub 29 together with the inner peripheral part of the turbine shell 24 of the turbine runner 12 by means of a plurality of rivets 53.

The inertial rotating body 56 is formed from the disk-shaped inertia plate 58 and the weight-adding member 59, the disk-shaped inertia plate 58 being sandwiched between the pair of retaining plates 84 and 85 forming the spring holder 42C and having its inner peripheral part rotatably supported on the output hub 29, and the weight-adding member 59 being fixed to the outer periphery of the inertia plate 58.

Spring-retaining portions 84a and 85a for retaining the dynamic damper spring 57 are formed at a plurality of, for example four, locations equally spaced in the peripheral direction of the retaining plates 84 and 85, part of the dynamic damper spring 57 facing the exterior. The spring housing hole 61 housing part of the dynamic damper spring 57 is formed in a portion, corresponding to the spring-retaining portions 84a and 85a, of the inertia plate 58 so that opposite end parts, along the peripheral direction of the inertia plate 58, of the spring housing hole 61 abut against opposite end parts of the dynamic damper spring 57 when the lockup clutch 40 is in a non-connected state.

The cylindrical spacers 63 each inserted into the elongated holes 62 provided at a plurality of, for example four, locations equally spaced in the peripheral direction of the inertia plate 58 are disposed between the pair of retaining plates 84 and 85 on the inside, along the radial direction of the inertial rotating body 56, of the spring housing hole 61, and the cylindrical spacers 65 inserted into the elongated holes 64 provided at a plurality of, for example four, locations equally spaced in the peripheral direction of the inertia plate 58 are disposed between the pair of retaining plates 84 and 85 on the outside, along the radial direction of the inertial rotating body 56, of the spring housing hole 61. The retaining plates 84 and 85 are linked by means of the rivets 66 and 67 extending through the spacers 63 and 65.

A plurality of abutment claw portions 85b are provided integrally with one of the pair of retaining plates 84 and 85 forming the spring holder 42C, in this embodiment the retaining plate 85 on the clutch piston 43 side of the lockup clutch 40 among the retaining plates 84 and 85, the abutment claw portions 85b being inserted through the cutout part 70 formed in the spring retaining member 51 fixed to the clutch piston 43 and sandwiching the damper spring 49 between themselves and the spring abutment portion 51c of the spring retaining member 51. The damper mechanism 47C is formed by disposing the damper spring 49 between the spring abutment portion 51c of the spring retaining member 51 fixed to the clutch piston 43 and the abutment claw portion 85b of the retaining plate 85 of the spring holder 42C.

Of the pair of retaining plates 84 and 85, the retaining plate 85 on the side on which the abutment claw portion 85b is provided has a plate thickness that is set larger than the plate thickness of the other retaining plate 84.

The abutment claw portion 85b is bent so that part of the abutment claw portion 85b overlaps the inertia plate 58 on a projection onto a plane passing through the abutment claw portion 85b and the axis of the output shaft 27, and in this third embodiment a rotation restricting hole 86 extending lengthwise in the peripheral direction is formed in the inertia plate 58, part of the abutment claw portion 85b being housed in the rotation restricting hole 86. That is, an intermediate part of the abutment claw portion 85b is bendingly formed so as to protrude toward the side opposite to the damper mechanism 47C, and the intermediate bent part of the abutment claw portion 85b is housed in the rotation restricting hole 86.

In accordance with the third embodiment, in spite of the abutment claw portion 85b being provided integrally with, of the pair of retaining plates 84 and 85, the retaining plate 85 on the clutch piston 43 side of the lockup clutch 40, in the same manner as in the first embodiment the axial distance between the clutch piston 43 and the dynamic damper mechanism 48C can be shortened while maintaining the function of the spring retaining member 51 in retaining the damper spring 49.

Fourth Embodiment

Figure 8:
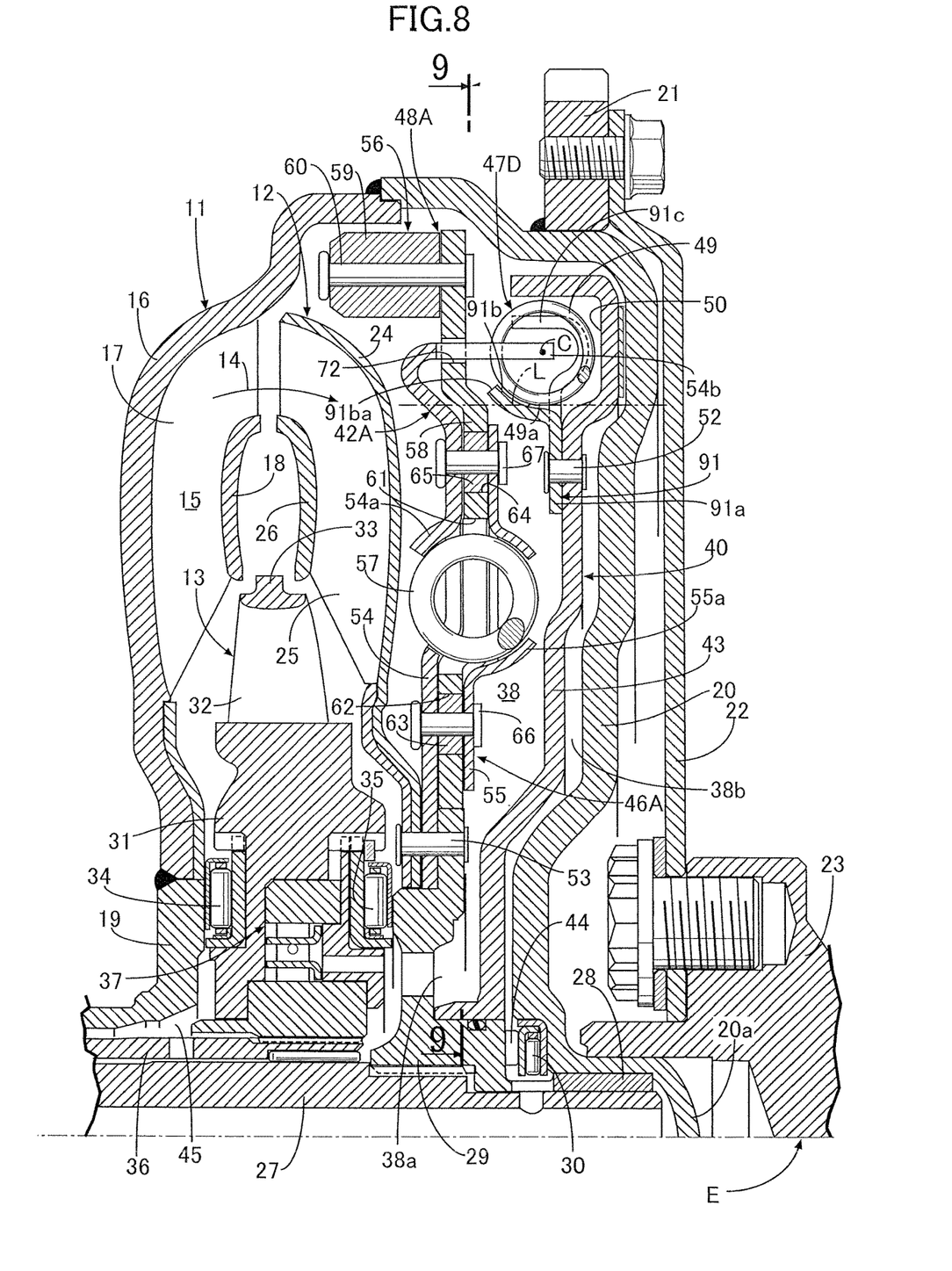
FIG. 8 is a vertical sectional view of a torque converter of a fourth embodiment. (fourth embodiment)
Figure 9:
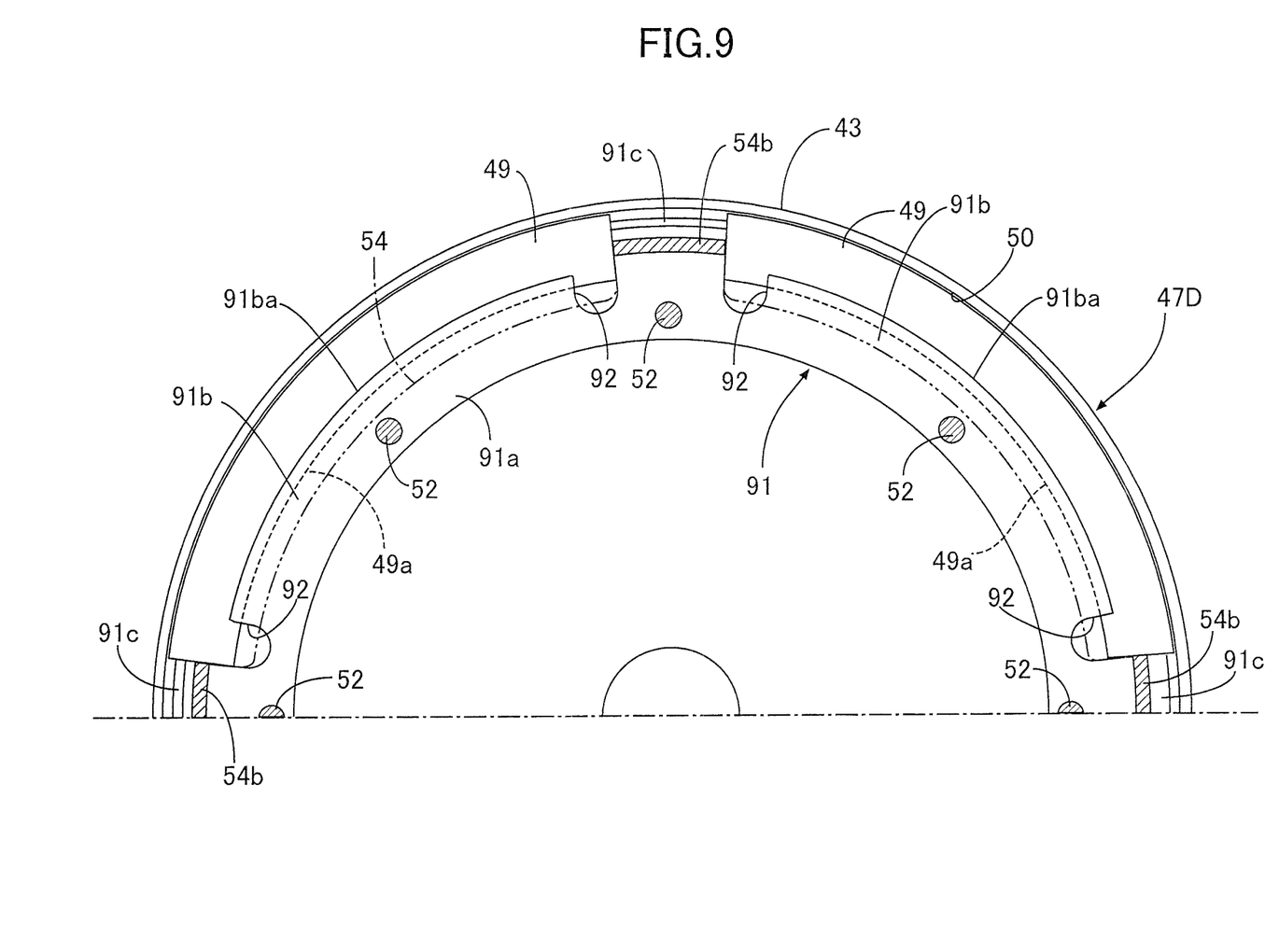
FIG. 9 is a view of a damper mechanism from the direction of arrowed line 9-9 in FIG. 8. (fourth embodiment)

A fourth embodiment of the present invention is explained by reference to FIG. 8 and FIG. 9; parts corresponding to those of the first to third embodiments above are denoted by the same reference numerals and symbols and only illustrated, detailed explanation thereof being omitted.

When the lockup clutch 40 has attained a connected state, the torque transmitted from the vehicle engine E to the transmission cover 20 is mechanically transmitted to the output shaft 27 via the torque transmission path 46A, which includes the clutch piston 43, the spring holder 42A, and the output hub 29, at least one (one in this embodiment) damper mechanism 47D is disposed in the torque transmission path 46A, and the dynamic damper mechanism 48A is attached thereto.

The damper mechanism 47D is formed by disposing a plurality of, for example four, coil-shaped damper springs 49 at equal intervals in the peripheral direction between the spring holder 42A and a spring retaining member 91 fixed to the clutch piston 43.

The annular housing recess part 50 is formed in a face, on the side opposite to the transmission cover 20, of the outer peripheral part of the clutch piston 43, and the spring retaining member 91 retaining the damper springs 49, which are housed within the housing recess part 50 at equal intervals in the peripheral direction, between itself and the clutch piston 43 is fixed to the clutch piston 43.

The spring retaining member 91 is formed so as to integrally have a ring plate portion 91a disposed coaxially with the clutch piston 43 while having an outer periphery substantially corresponding to the inner periphery of the housing recess part 50, a spring cover portion 91b formed into an arc-shaped cross section covering the inside of the damper spring 49 in the radial direction along the clutch piston 43, connected to four positions, equally spaced in the peripheral direction, of the outer periphery of the ring plate portion 91a, and formed lengthwise along the peripheral direction of the clutch piston 43, and a spring abutment portion 91c disposed between the spring cover portions 91b and connected to the outer periphery of the ring plate portion 91a so as to project further outward in the radial direction than the spring cover portion 91b, the ring plate portion 91a being fixed to the clutch piston 43 by means of a plurality of rivets 52.

The spring abutment portions 91c are disposed between the four damper springs 49, and when the lockup clutch 40 is in a non-connected state, the spring abutment portions 91c abut against an end part of the damper springs 49 on its opposite sides.

Provided integrally with one of the pair of retaining plates 54 and 55 forming the spring holder 42A of the dynamic damper mechanism 48A, in this embodiment, of the retaining plates 54 and 55, the retaining plate 54 on the side opposite to the clutch piston 43 of the lockup clutch 40, are a plurality of abutment claw portions 54b sandwiching the damper spring 49 between themselves and the spring abutment portion 51c of the spring retaining member 51.

The spring cover portion 91b is formed so that at least part thereof is positioned further outside than the inside end 49a of the damper spring 49 in the radial direction of the output shaft 27, and in this embodiment, the entirety of an outer end 91ba of the spring cover portion 91b along the radial direction is positioned at a position further outside along the radial direction than a virtual straight line L passing through the inside end 49a of the damper spring 49 and extending in parallel with the axis of the output shaft 27 on a projection onto a plane passing through the abutment claw portion 54b and the axis of the output shaft 27, the abutment claw portion 54b being capable of abutting against the damper spring 49 outside the spring cover portion 91b along the radial direction.

Furthermore, a recess part 92 for forming the spring cover portion 91b into an arc-shaped cross section so as to cover the damper spring 49 is formed in opposite sides of a base part of the spring abutment portion 91c.

The abutment claw portion 54b is bendingly formed so that part of the abutment claw portion 54b overlaps the inertia plate 58 on a projection onto a plane passing through the abutment claw portion 54*b* and the axis of the output shaft 27, the abutment claw portion 54*b* being inserted into the rotation restricting hole 72, formed in the inertia plate 58 so as to extend lengthwise in the peripheral direction, so that part of the abutment claw portion 54*b* is housed in the rotation restricting hole 72.

When the lockup clutch 40 attains a connected state and the clutch piston 43 and the spring retaining member 91 rotate, the spring abutment portion 91*c* compresses the damper spring 49 between itself and the abutment claw portion 54*b*, and power is transmitted from the damper spring 49 to the output shaft 27 via the spring holder 42A connected to the abutment claw portion 54*b* and the output hub 29. That is, torque is mechanically transmitted between the clutch piston 43 and the output shaft 27 via the torque transmission path 46A.

Since the spring retaining member 91 does not have a function of restricting the relative position in the peripheral direction of the abutment claw portion 54*b* with respect to the clutch piston 43, due to the damper spring 49 being in a state of intimate contact in the axial direction the relative position in the peripheral direction of the abutment claw portion 54*b* with respect to the clutch piston 43 is restricted, and there is the advantage that a high strength is not required for the spring retaining member 91 and the plate thickness of the spring retaining member 91 can be reduced.

In accordance with the fourth embodiment also, in the same manner as in the first embodiment, the axial distance between the clutch piston 43 and the dynamic damper mechanism 48A can be shortened while maintaining the function of the spring retaining member 91 in retaining the damper spring 49.

Embodiments of the present invention are explained above, but the present invention is not limited to the above embodiments and may be modified in a variety of ways as long as the modifications do not depart from the spirit and scope thereof.

The invention claimed is:

1. A torque converter comprising a dynamic damper mechanism provided in a torque transmission path via which, when a lockup clutch having a clutch piston is connected, torque is transmitted between the clutch piston and an output shaft, the clutch piston being capable of being frictionally connected to a transmission cover joined to a pump impeller, the dynamic damper mechanism comprising a pair of retaining plates arranged with a gap in an axial direction of the output shaft while rotating together with a rotation transmitting member forming part of the torque transmission path, an inertial rotating body having an inertia plate sandwiched between the retaining plates, and a dynamic damper spring provided between the retaining plates and the inertia plate, and a damper mechanism disposed in the torque transmission path, the damper mechanism being formed from a plurality of damper springs, a spring retaining member fixed to the clutch piston while having a plurality of spring cover portions formed into an arc-shaped cross section so as to retain the damper springs between the spring cover portions and the clutch piston and a plurality of cutout parts disposed between the spring cover portions, and a plurality of abutment claw portions provided integrally with one of the pair of retaining plates so as to be inserted into the cutout part and sandwich the damper spring between the abutment claw portion and the spring retaining member wherein the cutout part is formed so that an inner end of the cutout part along a radial direction of the output shaft is positioned further outside than an inside end of the damper spring in the radial direction, and the abutment claw portion is formed so that part of the abutment claw portion overlaps the inertia plate in a projection onto a plane passing through the abutment claw portion, and an axis of the output shaft lies in the plane.

2. The torque converter according to claim 1, wherein a rotation restricting hole housing part of the abutment claw portion and extending lengthwise in a peripheral direction is formed in the inertia plate so that abutment of the abutment claw portion against an end part in the peripheral direction of the rotation restricting hole restricts the relative rotational angle between the pair of retaining plates and the inertial rotating body.

3. The torque converter according to claim 2, wherein part of the other retaining plate of the pair of retaining plates is disposed within the rotation restricting hole and abuts against and is fixed by swaging to the abutment claw portion.

4. A torque converter comprising a dynamic damper mechanism provided in a torque transmission path via which, when a lockup clutch having a clutch piston is connected, torque is transmitted between the clutch piston and an output shaft, the clutch piston being capable of being frictionally connected to a transmission cover joined to a pump impeller, the dynamic damper mechanism comprising a pair of retaining plates arranged with a gap in an axial direction of the output shaft therebetween while rotating together with a rotation transmitting member forming part of the torque transmission path, an inertial rotating body having an inertia plate sandwiched between the retaining plates, and a dynamic damper spring provided between the retaining plates and the inertia plate, and a damper mechanism disposed in the torque transmission path, the damper mechanism being formed from a plurality of damper springs, a spring retaining member fixed to the clutch piston while having a plurality of spring cover portions formed into an arc-shaped cross section so as to retain the damper springs between the spring cover portions and the clutch piston, and a plurality of abutment claw portions provided integrally with one of the pair of retaining plates so as to sandwich the damper spring between the abutment claw portion and the spring retaining member, wherein the spring cover portion is formed so that at least part of the spring cover portion is positioned further outside in a radial direction than an inside end of the damper spring, and the abutment claw portion, which can abut against the damper spring outside, along the radial direction, the spring cover portion, is formed so that part of the abutment claw portion overlaps the inertia plate in a projection onto a plane passing through the abutment claw portion, and an axis of the output shaft lies in the plane.

* * * * *